(12) United States Patent
Baek et al.

(10) Patent No.: US 12,061,299 B2
(45) Date of Patent: Aug. 13, 2024

(54) RADIATION DETECTOR AND RADIOGRAPHIC METHOD USING SAME

(71) Applicant: LG ELECTRONICS INC., Seoul (KR)

(72) Inventors: Seungchan Baek, Seoul (KR); Youngsoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 17/780,760

(22) PCT Filed: Nov. 29, 2019

(86) PCT No.: PCT/KR2019/016696
§ 371 (c)(1),
(2) Date: May 27, 2022

(87) PCT Pub. No.: WO2021/107217
PCT Pub. Date: Jun. 3, 2021

(65) Prior Publication Data
US 2022/0413167 A1 Dec. 29, 2022

(51) Int. Cl.
*G01T 1/17* (2006.01)
*G01T 1/02* (2006.01)
*G01T 1/20* (2006.01)

(52) U.S. Cl.
CPC ............ *G01T 1/17* (2013.01); *G01T 1/026* (2013.01); *G01T 1/20184* (2020.05)

(58) Field of Classification Search
CPC ........ G01T 1/026; G01T 1/17; G01T 1/20184
See application file for complete search history.

(56) References Cited

U.S. PATENT DOCUMENTS 6,243,441 B1 * 6/2001 Zur ............................ G01T 1/24
378/98.7
6,404,851 B1 * 6/2002 Possin .................. G01T 1/2928
348/E3.019
(Continued)

FOREIGN PATENT DOCUMENTS

JP 2011-513702 4/2011
KR 10-2014-0000477 1/2014
(Continued)

*Primary Examiner* — Blake C Riddick
(74) *Attorney, Agent, or Firm* — LEE, HONG, DEGERMAN, KANG & WAIMEY

(57) ABSTRACT

A radiation detector, which can reduce power consumption of a read-out module, comprises: a radiation detection unit which includes a plurality of pixels connected to a plurality of gate lines and a plurality of data lines that intersect and arranged in a matrix form, and which store, in the plurality of pixels, charges generated in proportion to radiation dosage; a gate module for selecting at least one of the plurality of gate lines and controlling the selected gate line; the read-out module for selecting at least one of the plurality of data lines, and reading charges stored in at least one exposure detection pixel determined by the selected data line and the selected gate line; and an automatic exposure detection unit for determining whether the radiation detection unit is exposed to radiation by using a charge quantity read by the read-out module from the exposure detection pixel in every preset period.

10 Claims, 3 Drawing Sheets

(56) References Cited

U.S. PATENT DOCUMENTS

| | | | | |
|---|---|---|---|---|
| 7,038,820 | B1* | 5/2006 | Kindt | H04N 23/71 |
| | | | | 358/475 |
| 8,547,476 | B2* | 10/2013 | Olsen | H04N 23/72 |
| | | | | 348/297 |
| 2004/0217294 | A1* | 11/2004 | Zur | H01L 27/14678 |
| | | | | 250/370.09 |
| 2007/0164115 | A1* | 7/2007 | Joseph | G06K 7/10722 |
| | | | | 235/462.25 |
| 2009/0140122 | A1* | 6/2009 | Suzuki | H04N 23/672 |
| | | | | 250/201.2 |
| 2013/0032696 | A1* | 2/2013 | Tajima | A61B 6/42 |
| | | | | 250/208.1 |
| 2013/0208860 | A1* | 8/2013 | Sugizaki | A61B 6/4233 |
| | | | | 378/62 |
| 2014/0086391 | A1* | 3/2014 | Ohta | H04N 25/53 |
| | | | | 378/91 |
| 2014/0124678 | A1* | 5/2014 | Yoneyama | H04N 25/75 |
| | | | | 250/393 |
| 2014/0205066 | A1* | 7/2014 | Kitagawa | A61B 6/542 |
| | | | | 378/62 |
| 2015/0078530 | A1* | 3/2015 | Hawver | H04N 5/32 |
| | | | | 378/115 |
| 2015/0131785 | A1* | 5/2015 | Topfer | H04N 5/32 |
| | | | | 378/98 |
| 2016/0187495 | A1* | 6/2016 | Scott | H01L 31/119 |
| | | | | 250/370.07 |
| 2016/0282476 | A1* | 9/2016 | Kappler | G01T 1/17 |
| 2016/0377737 | A1* | 12/2016 | Okada | G01T 1/17 |
| | | | | 250/394 |
| 2017/0079610 | A1* | 3/2017 | Morf | A61B 6/4233 |
| 2017/0227475 | A1* | 8/2017 | Shin | G01T 1/15 |
| 2017/0374295 | A1* | 12/2017 | Topfer | H04N 25/63 |
| 2018/0140264 | A1* | 5/2018 | Fujiyoshi | G01T 1/247 |
| 2018/0164445 | A1* | 6/2018 | Sacchi | A61B 6/4233 |
| 2018/0234645 | A1* | 8/2018 | Sakane | H04N 25/44 |
| 2019/0029618 | A1* | 1/2019 | Sato | A61B 6/4233 |
| 2019/0051680 | A1* | 2/2019 | Hanzawa | H04N 25/77 |
| 2020/0041664 | A1* | 2/2020 | Furumoto | G01N 23/083 |
| 2020/0069260 | A1* | 3/2020 | Okuno | A61B 6/46 |
| 2020/0112664 | A1* | 4/2020 | Yin | H01L 24/48 |
| 2020/0292473 | A1* | 9/2020 | Huang | G01N 23/04 |
| 2020/0348424 | A1* | 11/2020 | Watanabe | H04N 5/32 |
| 2021/0041580 | A1* | 2/2021 | Steadman Booker | A61B 6/54 |
| 2021/0096268 | A1* | 4/2021 | Yadegari | H01L 29/42324 |
| 2021/0097363 | A1* | 4/2021 | Yadegari | G06K 19/0716 |
| 2021/0243389 | A1* | 8/2021 | Sawada | A61B 6/00 |

FOREIGN PATENT DOCUMENTS

| | | |
|---|---|---|
| KR | 10-2014-0107335 | 9/2014 |
| KR | 10-1676426 | 11/2016 |
| KR | 10-2017-0016508 | 2/2017 |
| WO | 2011110985 | 9/2011 |
| WO | 2017-003034 | 1/2017 |

\* cited by examiner

RADIATION DETECTOR AND RADIOGRAPHIC METHOD USING SAME

CROSS-REFERENCE TO RELATED APPLICATIONS

This application is the National Stage filing under 35 U.S.C. 371 of International Application No. PCT/KR2019/016696, filed on Nov. 29, 2019, the contents of which are hereby incorporated by reference herein its entirety.

TECHNICAL FIELD

The present disclosure relates to technology related to a radiation detector for automatically detecting whether radiation exposure occurs.

BACKGROUND ART

Generally, a radiographic apparatus may include a radiation generator for irradiating a subject with radiation and a radiation detector for detecting radiation having passed through the subject.

The radiation detector may be classified into a first-type radiation detector utilizing a separate photodiode sensor for automatic exposure detection (AED) and a second-type radiation detector utilizing a panel in which cells having photodiodes are integrated.

The second-type radiation detector utilizing the panel can sense a larger area and a lower dose compared to the first-type radiation detector utilizing the separate photodiode sensor.

However, the second-type radiation detector utilizing the panel should always read and check charges of a specific sensing line of the panel at intervals of a predetermined period, so that a readout module or a readout integrated circuit (ROIC) required for such reading and checking of the second-type radiation detector should always be maintained in an active state.

As a result, the second-type radiation detector utilizing the panel has a disadvantage in that much more power consumption occurs than in the first-type radiation detector utilizing the separate photodiode sensor. Specifically, a portable radiation detector has a disadvantage in that the large amount of battery power is consumed and thus a total available time becomes shorter.

DISCLOSURE

Technical Problem

An object of the present disclosure is to provide a radiation detector capable of minimizing power consumption by controlling a power supply or a sensing period of a readout module, and a radiographic method using the same.

Technical Solutions

In accordance with an aspect of the present disclosure, a radiation detector may include a radiation detection unit including a plurality of pixels arranged in a matrix form connected to a plurality of gate lines and a plurality of data lines crossing each other, and configured to store, in the plurality of pixels, charges generated in proportion to radiation dose; a gate module configured to select at least one gate line from among the plurality of gate lines, and to control the selected gate line; a readout module configured to select at least one data line from among the plurality of data lines, and to read charges stored in at least one exposure detection pixel determined by the selected data line and the selected gate line; and an automatic exposure detection unit configured to determine whether the radiation detection unit is exposed to radiation based on the amount of charges read from the exposure detection pixel for each preset period.

The automatic exposure detection unit may be configured to apply a control signal for controlling the readout module in an active mode or an inactive mode.

The readout module may read charges stored in the exposure detection pixel in the active mode, and may consume less power in the inactive mode than in the active mode.

When the amount of charges read by the readout module is less than a reference value in the active mode, the automatic exposure detection unit may switch the readout module to the inactive mode during a predetermined time.

When the amount of charges read by the readout module is equal to or greater than a reference value in the active mode, the automatic exposure detection unit may maintain the active mode and generates a scan request signal for reading charges that are required for outputting a radiation image while being stored in the plurality of pixels.

The automatic exposure detection unit may control a signal to be applied to the gate module in response to a control signal applied to the readout module.

The readout module may include a plurality of readout integrated circuits. The automatic exposure detection unit may control only at least one readout integrated circuit corresponding to the selected at least one data line from among the plurality of readout integrated circuits to switch to the active mode.

In accordance with another aspect of the present disclosure, a radiographic method may be configured to use a radiation detector that includes a plurality of pixels arranged in a matrix form connected to a plurality of gate lines and a plurality of data lines crossing each other, and a radiation detection unit for storing, in the plurality of pixels, charges generated in proportion to radiation dose. The radiographic method may include determining whether a predetermined time has elapsed; switching a readout module connected to the plurality of data lines to an active mode after lapse of the predetermined time; reading charges stored in the plurality of pixels; determining whether or not radiation exposure occurs; and when the amount of charges stored in the plurality of pixels is less than a reference value, switching the readout module to an inactive mode in which less power is consumed for a predetermined time than in the active mode.

The radiographic method may further include, when the amount of charges stored in the plurality of pixels is equal to or greater than a reference value, maintaining the active mode; and generating a scan request signal for reading charges required for radiation image output purposes from the plurality of pixels.

The radiographic method may further include selecting at least one gate line from among the plurality of gate lines; selecting at least one data line from among the plurality of data lines; and determining an exposure detection pixel by the selected gate line and the selected data line.

The switching the readout module to the active mode may include activating only one readout integrated circuit corresponding to the selected data line from among a plurality of readout integrated circuits included in the readout module.

Advantageous Effects

As is apparent from the above description, according to at least one of the embodiments of the present disclosure, a power supply or a sensing period of the readout module is controlled to minimize power consumption.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

In description of the present disclosure, the terms "comprising," "including," and "having" shall be understood to designate the presence of particular features, numbers, steps, operations, elements, parts, or combinations thereof, but not to preclude the presence or addition of one or more other features, numbers, steps, operations, elements, parts, or combinations thereof.

Figure 1:
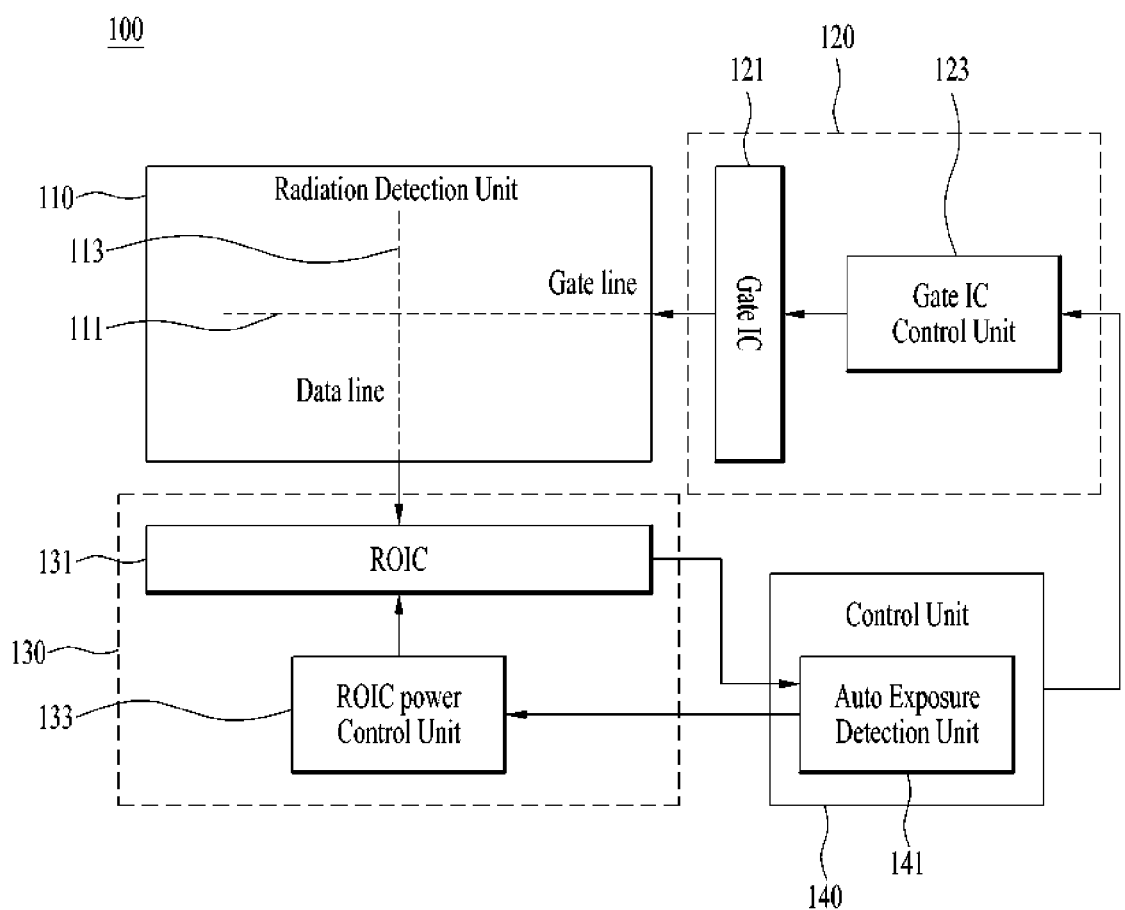
FIG. 1 is a block diagram illustrating a radiation detector according to an embodiment of the present disclosure.

FIG. 1 is a block diagram illustrating a radiation detector 100 according to an embodiment of the present disclosure.

Referring to FIG. 1, the radiation detector 100 may include a radiation detection unit 110, a gate module 120, a readout module 130, and a main controller 140.

The radiation detection unit 110 is irradiated with radiation, and charges are generated due to the radiation. The radiation detection unit 110 may include a plurality of pixels arranged in a matrix form. Each of the plurality of pixels may store charges that are generated in proportion to radiation dose. The radiation detection unit 110 may be implemented as a direct radiation detector for directly generating charges using a material (for example, a photoconductive material, etc.) that is irradiated with radiation to generate charges, and/or may be implemented as an indirect radiation detector for indirectly generating charges through a photodiode by converting radiated radiation into visible light using a material (e.g., a scintillator, etc.) capable of converting radiation into visible light. The indirect radiation detection unit 110 may include a scintillator for receiving the radiation for each pixel and outputting visible light photons, a photodiode for generating charges (or electric signals) by receiving the output visible light photons, and a storage element (e.g., a storage capacitor) for storing the generated charges. On the other hand, the radiation detection unit 110 may use a photodiode capable of storing charges therein. For example, the radiation detection unit 110 may be implemented as a panel including a photoelectric conversion unit capable of accumulating charges generated by radiation and an electrode capable of reading the accumulated charges.

The gate module 120 may select at least one gate line 111 from among a plurality of gate lines 111, and may control the selected gate line 111. For example, when the gate module 120 selects the gate line 111, a storage element (e.g., a pixel electrode, a storage capacitor, etc.) in the selected gate line 111 may be turned on, and when the storage elements in the selected gate line 111 are turned on, charges accumulated in the storage elements may move to the data line 113.

The gate module 120 may select at least one gate line 111 to detect radiation exposure among the plurality of gate lines 111 for an automatic exposure detection (AED) function. When the gate line 111 scheduled to detect radiation exposure is selected, the radiation detector 100 may scan (or may readout charges) only the selected gate line 111 until radiation exposure is sensed, and may read out the amount of charges based on the result of scanning, thereby sensing radiation exposure. On the other hand, the gate line 111 scheduled to sense radiation exposure may be selected as the gate line 111 close to the central portion, which is a portion irradiated with a lot of radiation, but is not limited thereto. The gate 111 scheduled to sense radiation exposure may select a desired position (e.g., an upper end, a lower end, etc.) or may select a plurality of gate lines 111 (e.g., three gate lines 111 at the upper end, the central portion, and the lower end).

The gate module 120 may include at least one gate integrated circuit (Gate IC) 121 for opening the gate line selected to be read out or for turning on storage elements included in the selected gate line, and a gate IC control unit (hereinafter referred to as a gate IC controller) 123 for controlling the operation of the gate IC 121. The gate IC controller 123 may be implemented as an internal logic circuit of a main controller 140.

The readout module 130 may select at least one data line 113 from among the plurality of data lines 113, and may read charges stored in a pixel (or corresponding to a point where the selected data line 113 and the gate line 111 selected by the gate module 120 cross each other) determined by the selected data line 113 and the gate line 111 selected by the gate module 120. For example, when the storage element is turned on and charges accumulated in the storage element move to the data line 113, the readout module 130 may select the data line 113 to which the charges have moved and thus read charges from the selected data line 113. The readout module 130 may convert the read charges into an electrical signal.

The readout module 130 may select at least one data line 113 intersecting the gate line 111 selected for detection of radiation from among the plurality of data lines 113, and may read charges stored in at least one exposure detection pixel determined by the selected at least one data line 113 and the gate line 111 selected for detection of radiation exposure. At this time, only one exposure detection pixel can be used, but a plurality of exposure detection pixels can also be used to more stably detect radiation exposure. Accordingly, the automatic exposure detection (AED) function can be simply performed by reading charges only in the exposure detection pixel.

The readout module 130 may include a readout integrated circuit (ROIC) 131 for reading and converting a charge value of the gate line 111 into a digital value, and an ROIC power control unit (hereinafter referred to as an ROIC power controller) 133 for controlling a mode of a power supply of the ROIC 131. The ROIC power controller 133 may be an internal logic circuit of the main controller 140.

On the other hand, the plurality of gate lines 111 and the plurality of data lines 113 may be grouped to be connected to an integrated circuit (IC), and each IC may include a plurality of channels, each of which is connected to a plurality of lines. For example, the radiation detector 100 may include a total of 24 integrated circuits (ICs) classified into 12 gate ICs 121 arranged in a vertical direction and 12 ROICs 131 arranged in a horizontal direction, and each IC may include 256 channels. In this case, the radiation detection unit 110 may be divided into (3072×3072) pixels, and 12 data lines 113 may be selected one by one in each IC to use 12 exposure detection pixels. Here, the width of each pixel may be set to 140 μm, and the range of the pixel value (e.g., the amount of electric charges stored in the pixel) may be set to 0 to 16384 (14 bits). In the case of selecting the data lines 113 one by one in each IC, the data line 113 corresponding to the same channel can be selected in each IC. In addition, when failure of the radiation exposure detection occurs in any one exposure detection pixel, it is possible to quickly move from a failed exposure detection pixel to the next exposure detection pixel. In addition, it is easy to recognize the position of each exposure detection pixel. In a situation where the position of each exposure detection pixel is recognized, the radiation exposure sensing speed may increase, and data indicating the amount of lost charges caused by radiation exposure detection may be easily corrected. On the other hand, 12 exposure detection pixels need not always be selected, and there is a need for only at least one exposure detection pixel to be selected. In addition, the AED operation is not limited by such exposure detection pixels, so that the overall mean or the desired number of exposure detection pixels may be changed as needed.

The main controller 140 may control the overall operation of the radiation detector 100. The main controller 140 may control at least one of the radiation detection unit 110, the gate module 120, and the readout module 130. The main controller 140 may include the automatic exposure detection (AED) unit 141 that processes data read from the ROIC 131 to determine whether radiation exposure occurs. The AED unit 141 may be an internal logic circuit of the main controller 140. The operation of the AED unit 141 to be described below can be carried out by the main controller 140.

The AED unit 141 can determine whether the radiation detection unit 110 is exposed to radiation using the amount of charges read from the exposure detection pixel by the readout module 130. For example, the amount of charges read by the readout module 130 when the radiation detection unit 110 is not exposed to radiation (or when the AED period is at an initial stage) is set to a reference charge amount value, and the reference charge amount value is then compared with a current read charge amount value. Thereafter, when the read charge amount value is equal to or greater than the reference charge amount value, it can be determined whether the radiation detection unit 110 is exposed to radiation.

The AED unit 141 may include a reference setting unit for setting a reference charge amount value using the charge amount read from the exposure detection pixel by the readout module 130 when the radiation detection unit 110 is not exposed to radiation; a comparison determination unit that compares the reference charge amount value with the current exposure detection pixel to determine whether the radiation detection unit 110 is exposed to radiation; and a signal generator for scanning a plurality of pixels of the radiation detection unit 110 when radiation exposure of the radiation detection unit 110 is determined, and thus generating a scan signal that reads out charges required for image output purposes from the plurality of pixels of the radiation detection unit 110.

Hereinafter, the operation of the AED unit 141 will be described in detail with reference to FIGS. 2 to 3.

Figure 2:
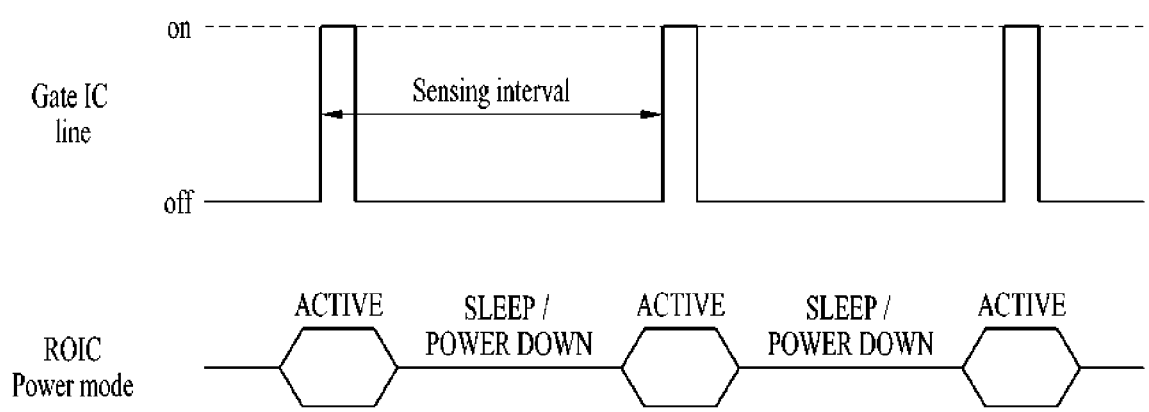
FIG. 2 is a conceptual diagram illustrating operations of a gate line and a readout integrated circuit (ROIC) of the radiation detector according to an embodiment of the present disclosure.

FIG. 2 is a conceptual diagram illustrating operations of the gate line 111 and the ROIC 131 of the radiation detector 100 according to an embodiment of the present disclosure.

Referring to FIGS. 1 and 2, the AED unit 141 may apply a control signal for controlling the readout module 130 in an active mode or an inactive mode. Here, the active mode may be a mode in which the readout module 130 reads charges stored in the exposure detection pixel, and the inactive mode may be a mode in which the readout module 130 consumes less power than the active mode. Here, the inactive mode may be a sleep mode or a power-down mode.

The AED unit 141 may maintain the active mode when the amount of charges read out by the readout module 130 is equal to or greater than a reference value. Here, the AED unit 141 may generate a scan request signal for reading charges (required for radiation image output purposes) stored in the plurality of pixels.

When the amount of charges read by the readout module 130 is less than the reference value, the AED unit 141 may switch the readout module 130 back to the inactive mode.

The AED unit 141 may switch the readout module 130 to the active mode or the inactive mode every preset period. Here, the preset period may be 100 ms to 500 ms.

The AED unit 141 may maintain the readout module 130 in the active mode for a first preset time, and may maintain the readout module 130 in the inactive mode for a second preset time longer than the first preset time. The AED unit 141 may change the sensing period by adjusting the first preset time and the second preset time, thereby controlling power consumption. Here, the second preset time may be a time during which charges remaining in the plurality of pixels are removed due to previous radiographic imaging. The AED unit 141 may adjust the first and second preset times based on the previous radiographic time. For example, when the previous radiographic time is longer than the reference time, the second preset time may be set to be longer. For example, when the previous radiographic time is shorter than the reference time, the second preset time may be set to be shorter. Here, the reference time may be 500 ms.

The AED unit 141 may select at least one selected gate line 111 and at least one selected data line 113. The AED unit 141 may open at least one selected gate line 111 at intervals of an arbitrary time, and may control the readout module 130 to repeatedly perform a sensing operation for reading the amount of charges accumulated in cells of the panel through the data line 113 intersecting the selected gate line 111. In this case, the opening of the gate line 111 may be an operation of turning on the storage elements disposed in the gate line 111. After completion of the sensing operation, the AED unit 141 may switch the power state of the ROIC 131 from the active mode to the inactive mode, thereby minimizing power consumption.

The AED 141 may control a signal to be applied to the gate module 120 in response to a control signal applied to the readout module 130. For example, the AED unit 141 may apply a control signal for switching to the inactive mode to the readout module 130, and then apply a control signal for opening the selected gate line 111. That is, the radiation detector 100 may switch the power state of the readout IC (ROIC) 131 to the active mode before the sensing operation begins in the panel sensing, and may switch the power state of the ROIC 131 to the inactive mode after the sensing operation is completed, thereby minimizing power consumption of the ROIC 131.

The AED unit 141 may select at least one ROIC 131 from among all ROICs 131, and may switch the selected ROIC 131 to the inactive mode. Specifically, the readout module 130 may include a plurality of ROICs 131. The AED unit 141 may control only at least one ROIC 131 corresponding to at least one data line 113 selected from among the plurality of ROICs 131 to switch to the active mode. This is to further reduce power consumption while maintaining the sensing sensitivity by selectively controlling the specific ROIC.

Figure 3:
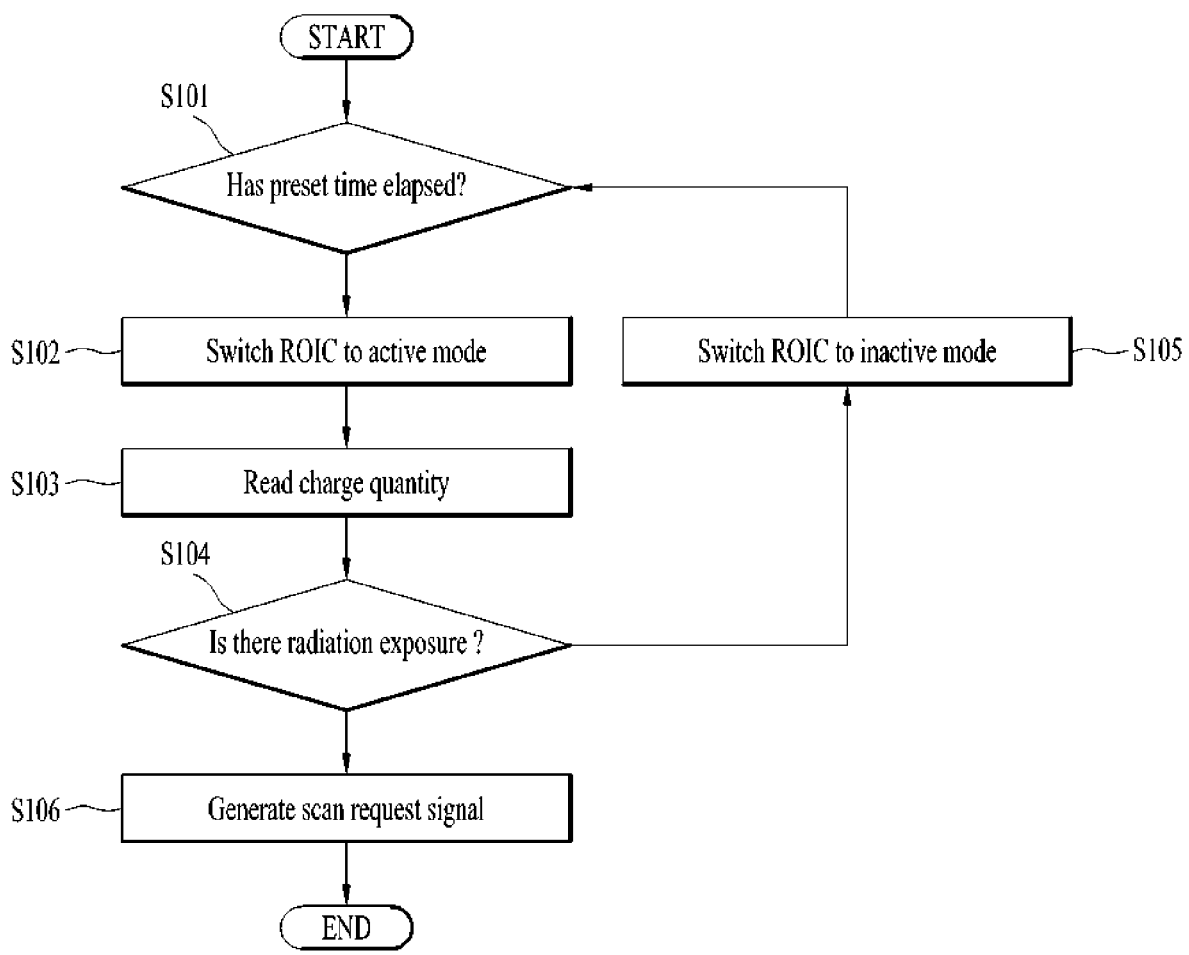
FIG. 3 is a flowchart illustrating a radiographic method according to an embodiment of the present disclosure.

FIG. 3 is a flowchart illustrating a radiographic method according to an embodiment of the present disclosure.

The radiographic method of FIG. 3 may be performed by the main controller 140 or the AED unit 141.

Referring to FIGS. 1 to 3, the radiation detector 100 may perform the sensing operation for automatically sensing radiation exposure based on a preset period, or may perform power mode control of the readout module 130 based on a preset period.

Referring to FIG. 3, it is determined whether a preset time has elapsed (S101). For example, the determination of whether the preset time has elapsed may be performed by an internal logic timer of the main controller 140 or the AED unit 141. Step S101 may further include initializing the internal logic timer. In addition, step S101 may further include setting a preset period/time.

When the preset time has elapsed, the readout module 130 connected to the plurality of data lines 113 may switch to the active mode (S102). For example, if the preset time has elapsed, this means that the increasing time of the timer becomes equal to a preset time interval. In this case, step S102 may activate only at least one ROIC 131 corresponding to the selected data line 113 from among the plurality of ROICs 131 included in the readout module 130.

Charges stored in the plurality of pixels may be read (S103). In this case, step S103 may further include opening the selected gate line 111.

It is determined whether or not radiation exposure occurs (S104). Specifically, the controller or the AED unit 141 may compare data indicating the read charge amount with a prestored reference value.

When the amount of charges stored in the plurality of pixels is less than the reference value, the readout module 130 may switch to the inactive mode in which less power than the active mode is consumed for a preset time (S105).

When the amount of charges stored in the plurality of pixels is equal to or greater than the reference value, a scan request signal for reading charges required for outputting the radiation image is generated (S106). Here, the controller or the AED unit 141 may control the readout module 130 to be maintained in the active mode for a preset time for radiographic imaging.

The radiographic method may further include selecting at least one gate line 111 from among the plurality of gate lines 111 before activating the readout module 130, selecting at least one data line 113 from among the plurality of data lines 113, and determining an exposure detection pixel by the selected gate line 111 and the selected data line 113.

According to at least one of the embodiments of the present disclosure, the power of the readout module or the sensing period of the readout module is controlled to minimize power consumption.

Those skilled in the art will appreciate that the present disclosure may be carried out in other specific ways than those set forth herein without departing from the spirit and essential characteristics of the present disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A radiation detector comprising:
a radiation detection device including a plurality of pixels arranged in a matrix form connected to a plurality of gate lines and a plurality of data lines crossing each other, and configured to store, in the plurality of pixels, charges generated in proportion to a radiation dose sensed by the radiation detection device;
a gate device configured to select at least one gate line from among the plurality of gate lines, and to control the selected gate line;
a readout device configured to select at least one data line from among the plurality of data lines, and to read charges stored in at least one exposure detection pixel determined by the selected data line and the selected gate line; and
an automatic exposure detection device configured to determine whether the radiation detection device is exposed to radiation based on an amount of charges read from the exposure detection pixel for a preset period.

2. The radiation detector according to claim 1, wherein:
the automatic exposure detection device is configured to apply a control signal for controlling the readout device in an active mode or an inactive mode; and
the readout device reads charges stored in the exposure detection pixel in the active mode, and consumes less power in the inactive mode than in the active mode.

3. The radiation detector according to claim 2, wherein:
based on an amount of charges read by the readout device being less than a reference value in the active mode, the automatic exposure detection device switches the readout device to the inactive mode during a predetermined time.

4. The radiation detector according to claim 2, wherein:
based on an amount of charges read by the readout device being equal to or greater than a reference value in the active mode, the automatic exposure detection device maintains the active mode and generates a scan request signal for reading charges that are used for outputting a radiation image while being stored in the plurality of pixels.

5. The radiation detector according to claim 2, wherein:
the automatic exposure detection device controls a signal to be applied to the gate device in response to a control signal applied to the readout device.

6. The radiation detector according to claim 2, wherein:
the readout device includes a plurality of readout integrated circuits; and
the automatic exposure detection device controls only a subset of the plurality of readout integrated circuits corresponding to the selected at least one data line to switch to the active mode.

7. A radiographic method configured to use a radiation detector that includes a plurality of pixels arranged in a matrix form and connected to a plurality of gate lines and a plurality of data lines crossing each other, and a radiation detection device for storing, in the plurality of pixels, charges generated in proportion to a radiation dose sensed by the radiation detector, the radiographic method comprising:
determining whether a predetermined time has elapsed;
switching a readout device connected to the plurality of data lines to an active mode after the predetermined time has elapsed;
reading charges stored in the plurality of pixels;
determining whether or not radiation exposure occurs; and
based on the amount of charges stored in the plurality of pixels i-s-being less than a reference value, switching the readout device to an inactive mode in which less power is consumed for a predetermined time than in the active mode.

8. The radiographic method according to claim 7, further comprising:
based on the amount of charges stored in the plurality of pixels being equal to or greater than a reference value, maintaining the active mode; and
generating a scan request signal for reading charges from the plurality of pixels, the charges used for outputting a radiation image.

9. The radiographic method according to claim 7, further comprising:
selecting at least one gate line from among the plurality of gate lines;
selecting at least one data line from among the plurality of data lines; and
determining an exposure detection pixel from the plurality of pixels based on the selected gate line and the selected data line.

10. The radiographic method according to claim 9, further comprising:
activating only one readout integrated circuit corresponding to the selected data line from among a plurality of readout integrated circuits included in the radiation detector.

* * * * *